US010628395B2

(12) United States Patent
Simon et al.

(10) Patent No.: US 10,628,395 B2
(45) Date of Patent: *Apr. 21, 2020

(54) DATABASE COMPARISON SYSTEM

(71) Applicant: International Business Machines Corporation, Armonk, NY (US)

(72) Inventors: Nisanth M. Simon, Westmead (AU); Tuong C. Truong, San Jose, CA (US); Ruiming Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

This patent is subject to a terminal disclaimer.

(21) Appl. No.: 15/156,695

(22) Filed: May 17, 2016

(65) Prior Publication Data
US 2016/0378794 A1 Dec. 29, 2016

Related U.S. Application Data

(63) Continuation of application No. 14/751,232, filed on Jun. 26, 2015, now Pat. No. 10,169,379.

(51) Int. Cl.
*G06F 16/00* (2019.01)
*G06F 16/21* (2019.01)
*G06F 16/13* (2019.01)

(52) U.S. Cl.
CPC .......... *G06F 16/211* (2019.01); *G06F 16/137* (2019.01)

(58) Field of Classification Search
CPC .................................................. G06F 16/211
See application file for complete search history.

(56) References Cited

U.S. PATENT DOCUMENTS

| 7,769,726 B2 | 8/2010 | Gitai et al. |
| 8,782,001 B2 | 7/2014 | Burke et al. |
| 2003/0172368 A1 | 9/2003 | Alambaugh et al. |

OTHER PUBLICATIONS

Simon et al., "Database Comparison System," U.S. Appl. No. 14/751,232, filed Jun. 26, 2015.
List of IBM Patents or Patent Applications Treated as Related, signed May 13, 2016, 2 pgs.
Salem et al., "Semantic Recognition of a Data Structure in Big-Data," Journal of Computer and Communications, 2014, 2, http://dx.doi.org/10.4236/jcc.2014.29013, pp. 93-102.

(Continued)

*Primary Examiner* — Ajith Jacob
(74) *Attorney, Agent, or Firm* — Erik K. Johnson

(57) ABSTRACT

Embodiments of the present invention disclose a method, computer program product, and system for detecting changes in database schema. The embodiments may include receiving a first database schema. The embodiments may include creating a first value corresponding to the first database schema by utilizing a compressed value algorithm. The compressed value algorithm may create a single value corresponding to each database schema. The embodiments may include receiving a second database schema. The embodiments may include creating a second value corresponding to the second database schema by utilizing the compressed value algorithm. The embodiments may include determining whether there is a difference between the first database schema and the second database schema by comparing the first value and the second value.

7 Claims, 4 Drawing Sheets

(56) References Cited

OTHER PUBLICATIONS

Anokhin et al., "Data Integration: Inconsistency Detection and Resolution Based on Source Properties," In Proc. FMII-01, International Workshop on Foundations of Models for Information Integration, 2001, pp. 1-15.

Fan et al, "Detecting Inconsistencies in Distributed Data," Data Engineering (ICDE), 2010 IEEE 26th International Conference, Mar. 1-6, 2010, Long Beach, CA, DOI: 10.1109/ICDE.2010.5447855, pp. 16 pages.

Ho, "On Detecting and Repairing Inconsistent Schema Mappings," B.Sc., The University of British Columbia (Vancouver), 2002, A Thesis Submitted in Partial Fulfillment of the Requirements for the Degree of Master of Science in the Faculty of Graduate Studies (Computer Science), Oct. 10, 2008, 84 pages.

DATABASE COMPARISON SYSTEM

BACKGROUND

The present invention relates to the determination of changes in database schema, and more particularly to the use of comparing compressed schemas to determine schema changes.

In a complex data systems there are many different loosely related components bundled together to serve as a software platform. These components include many open source and proprietary software packages. Many of these components have metadata (column names, data types, software types, software versions, etc.) that are typically stored into tables in a database known as the catalog database in the cluster. These metadata tables, known as schema, are fundamental to the operation of these software components.

In a complex environments the metadata schema in the catalog database can become inconsistent with what a software component expects, and causes the component to malfunction. The inconsistency may be caused by accidental change to tables such as table alter, table deletion in the catalog database.

BRIEF SUMMARY

Embodiments of the present invention disclose a method, computer program product, and system for detecting changes in database schema. The embodiments may include receiving a first database schema. The embodiments may include creating a first value corresponding to the first database schema by utilizing a compressed value algorithm. The compressed value algorithm may create a single value corresponding to each database schema. The embodiments may include receiving a second database schema. The embodiments may include creating a second value corresponding to the second database schema by utilizing the compressed value algorithm. The embodiments may include determining whether there is a difference between the first database schema and the second database schema by comparing the first value and the second value.

DETAILED DESCRIPTION

Embodiments of the present invention are directed generally to a system that detects changes in the schema of an operating customer database, from an original database that was installed. This is done by taking a digital fingerprint of the schema of the installed database by using a function to create a compressed value, and storing that compressed value. The compressed value function is one that returns the same unique output, given the same input, each time the compressed value function is applied; the compressed value function will return a different output for different input however small the difference is. When determining changes from the original database, a compressed value of the schema of the current database is created, and the two compressed values are compared to determine if the schema has been changed from the original database. This allows developers to take a snapshot of a database, and use that snapshot to quickly determine if there are changes in the database schema by comparing previous compressed values to those created by the current system.

In current Big Data schemes, large data structures may be contained in multiple servers, or clusters of servers, spread across multiple locations. The databases may approach terabytes or petabytes, where the associated schema can reach upwards of hundreds of megabytes, or even gigabytes. Additionally, complexities may arise if different hardware, data architectures, or database management systems make up a portion of the large data structures. In such a highly coordinated system, changes to the databases, architecture or management systems can create system malfunctions, or reduce system performance.

Often when investigating issues arising in these large data structures, determining what, if any, changes have been made is a key step to determining the cause of the issue. By using a compressed value, entire schemas for large data structures do not need to be stored to run any type of comparison, only the created compressed value. These compressed values may be measured in bytes or kilobytes, as compared to megabytes or hundreds of megabytes for extremely large databases, which may reduce the storage capacity necessary to maintain a log of such databases. Additionally, by comparing only compressed values, instead of individual components of previously stored schema with the current schema, the comparison may be orders of magnitude faster due to the reduced size and complexity of the comparisons to be run.

Figure 1:
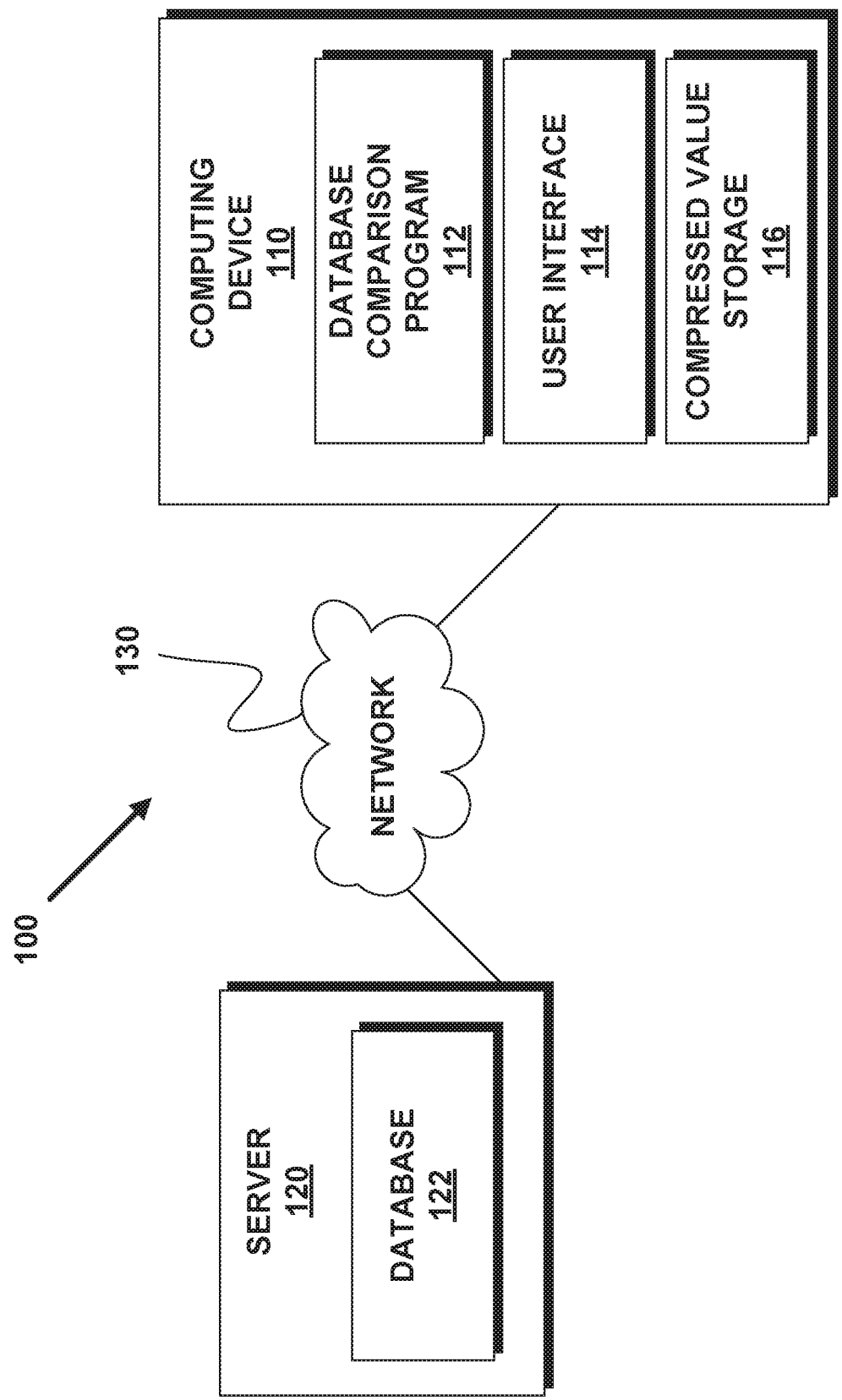
FIG. 1 illustrates a database comparison environment, in accordance with an embodiment of the invention.

FIG. 1 illustrates database comparison system 100, in accordance with an embodiment of the invention. In an example embodiment, database comparison system 100 includes a computing device 110 and a server 120 interconnected via a network 130.

In the example embodiment, network 130 may be the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between the computing device 110 and the Server 120.

Server 120, which is described in more detail below, represents one or more network-based applications. Server 120 may contain, and run, a database, as described below. Server 120 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 120 that are linked together and communicate through a communications network, such as the network 130.

Server 120 may include internal or external hardware components, as depicted and described in further detail below with reference to FIG. 4.

User computing device 110 represents a user computing environment that contains information about databases installed on a client's server, as well as programs to compare the initial database conditions to the database located on the client server. In the example embodiment, user computing device 110 may be a desktop computer, a notebook, a laptop computer, a thin client, or any other electronic device or computing system capable of receiving and sending data to and from other devices via network 120, in accordance with one or more embodiments of the invention. User computing device 110 may include database comparison program 112, user interface 114 and compressed value storage 116. User computing device 110 may contain internal and external hardware components, as depicted and described in further detail below with reference to FIG. 4.

While FIG. 1 illustrates database 122 located on server 120, and database comparison program 112, user interface 114 and compressed value storage 116 located on computing device, and number of arrangements are contemplated. For example, it is possible for database comparison program 112, user interface 114, compressed value storage 116 and database 122 to all be located on the server 120. The illustrated locations of the programs and the data is a single example, and should not be construed as being the only embodiment. This is good, but here's another: In FIG. 1, the database 122, database comparison program 112, user interface 114 and compressed value storage 116 are co-located on server 120. However, these components may be distributed among other servers in a cluster, or cloud cluster, thus eliminating a single point of failure.

Database 122 includes a collection of related information. The related information is defined by the relationships amongst data in separate tables, which forms a database. This relationship may be shown using keys, or other similar markers, to tie pieces of information together. In some embodiments, multiple different products or database architectures may exist in the database 122. Database 122 may be stored on server 120, but only requires a device with sufficient memory and hard drive space to enable the storage of information on the database. The information located in the initial database may be organized based on the schema of the database 122. The schema may be the blueprint of how the data in the database 122 is organized, and contain formulas or commands representing constraints or parameters of the database 122. The schema may define properties such as, for example, the tables, fields, relationships, views, indexes, packages, procedures, functions, queues, triggers, types, sequences, materialized views, synonyms, database links, directories and XML schemas.

User interface 114 includes components used to receive input from a user and transmit the input to an application residing on computing device 110. In an example embodiment, user interface 114 uses a combination of technologies and devices, such as a graphical user interface, to provide a platform to enable users of computing device 110 to interact transmit and receive information from database comparison program 112.

Figure 2:
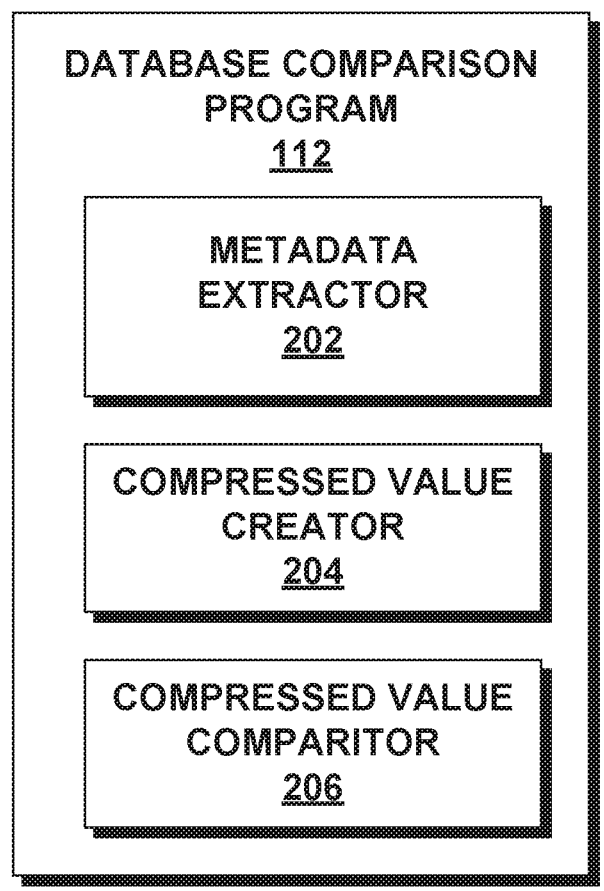
FIG. 2 is a functional block diagram of the database comparison program, in accordance with an embodiment of the invention.

FIG. 2 is a functional block diagram of database comparison program 112 (FIG. 1). Database comparison program 112, and its components, may be located on computing device 110, or may be located in whole or in part on server 120, or any other device capable of performing the operation. Database comparison program 112 operates in order to determine if the schema of the database 122 has been changed between an initial date, such as an installation, update, or system maintenance, and the present date. The database comparison program 112 (FIG. 1) does this by receiving the schema of the database 122, and converting the schema of the database 122 (FIG. 1) into a compressed value, and stores this as a historical value in the compressed value storage 116 (FIG. 1), which is described in more detail below. After some period of time, the database comparison program 112 again receives the schema of the database 122, and converts the schema of the database 122 into a current compressed value. The historical compressed value is compared to the current compressed value, and differences in the compressed value would notify a user that the database schema has changed. Database comparison program 112 contains program modules for a metadata extractor 202, a compressed value creator 204, and a compressed value comparator 206. The modules may all be located on the same device, or may be distributed between computing device 110 and server 120.

In an embodiment, the compressed value may be created when a database is initially installed, and may pertain to all of the machine specific schema created during the installation. When an error is reported, and the schema is analyzed, the current compressed value may be created to compare against the historical value, to determine if changes to the schema are the root cause of the error. The analysis may be initiated manually, or may be automatically triggered as part of a recovery or problem determination procedure when specific procedures and triggers occur. One or more of these may execute automatically, based on encountering a predefined error condition.

Metadata extractor 202 is a module of database comparison program 112 that returns the values of the metadata schema from the database 122. The metadata extractor 202 may be co-located with the database comparison program 112, or may be part of any database management system that operates the database 122. In an example embodiment, the metadata extractor may be a utility for querying database structures, such as, for example, db2look. The metadata schema may be outputted as a data file, such as a file having a data description language (DDL). The metadata schema extracted by metadata extractor 202 may correspond to the schema for the entire database 122. In additional embodiments, the metadata extractor may parse the extracted schema into subsets of the database 122. The subsets may be determined using factors such as, for example, content administrator, location, type of data, tables or groups of tables. The subsets may allow for detection of changes in a more specific area of the database 122, or may focus on a specific portion of the schema that prone to change, and creating system errors.

Compressed value creator 204 takes the metadata schema extracted by the metadata extractor 202, and compresses the schema. The compressed value creator 204 also creates a time stamp associated with the creation, a schema name, an owner, the subset associated with the compressed value, etc. The current compressed value may be stored in a file, a database, or other similar storage where it may be easily retrieved. The compressed value creator 204 is a program that returns the exact same output, given the exact same input. For example, the compressed value creator may be a hash value function. This enables the compressed value creator 204 to reliably create a compressed value, such as a character string, from a large data set, such as a schema. By requiring that the compressed value creator 204 creates identical outputs given identical inputs, this means that the value created from the same data set, at two separate times, is identical. In an example embodiment, the compressed value creator 204 may be, for example, checksum, MD5 and SHA-3, or a similar customized algorithm.

Compressed value storage 116 receives the current compressed value created from the compressed value creator 204, and stores the compressed value in a database, such as compressed value storage 116. The current compressed value is stored in compressed value storage 116 as a historical compressed value. The database is organized such that the entry for the historical compressed value contains information relating to the location of the database it was created from, the time stamp of when it was created, and the name associated with the database. Additionally, the compressed values may contain other types of metadata to describe the time, date, place, location of the database, or location of creation of the compressed value.

Compressed value comparator 206 compares the current compressed value for the database 122 to the historical compressed value from the compressed value storage 116 corresponding to database 122. If the values are identical, then no change in the schema has occurred between when the historical compressed value was created, and the present. If the values are different, then the database is flagged as having changed from when the historical value was created. The user is then notified whether the database 122 has changed through user interface 114 using, for example, an alert, an entry in the database or operating system log. In additional embodiments, if the value for an entire database is different, the compressed value comparator 206 may compare historical values of subsets of the database 122 with current values of subsets of the database 122, to determine which portion of the database 122 has changed.

Figure 3:
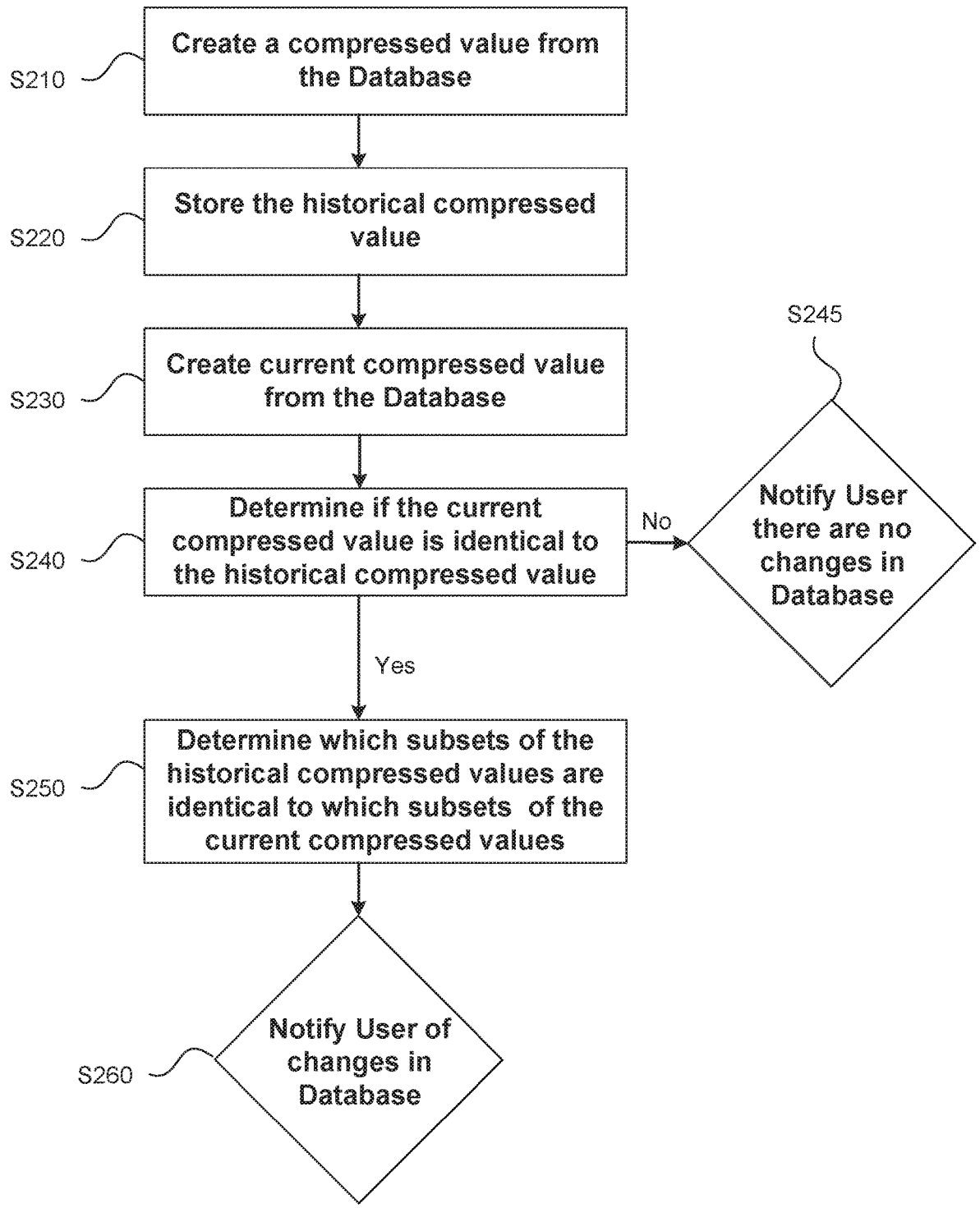
FIG. 3 is a flowchart illustrating the operations of the database comparison program of FIG. 1, in accordance with an embodiment of the invention.

FIG. 3 is a flow chart illustrating a method of operation of the database comparison program 112 (FIG. 1). The database comparison program is used to determine if the schema of a database has been changed from a previous version of the database. This may allow administrators to easily detect schema changes that may lead to malfunctions of the database.

Referring to step s210, the database comparison program 112 creates a compressed value from a database, such as database 122 (FIG. 1). The database comparison program 112 uses the metadata extractor 202 (FIG. 2) to obtain the metadata schema from the database, where the metadata schema details the parameters of the database. The metadata schema may be created based on a configurable parameter that groups by component, owner, etc. The database comparison program then creates a compressed value using the compressed value creator 204 (FIG. 2). In additional embodiments, the database comparison program 112 creates additional compressed values for subsets of the database.

Referring to step s220, the compressed value is stored as a historical compressed value in compressed value storage 116 (FIG. 1). The historical compressed value maintains a record of the database 122, corresponding to the time that the historical compressed value was created. In additional embodiments, compressed values corresponding to subgroups of the database may be stored.

Referring to step s230, the database comparison program 112 creates a current compressed value from the database 122. The current compressed value differs from the historical compressed value, in that it represents the current configuration of the database 122, while the historical compressed value represents the configuration of the database at some point in the past. The current compressed value is created by database comparison program 112 using the metadata extractor 202 to obtain the metadata schema from the database. The database comparison program then creates the current compressed value using the compressed value creator 204. In additional embodiments, if there are subsets for the historical compressed values, the database comparison program 112 creates the corresponding subsets for current compressed values of the database 122.

Referring to step s240, the database comparison program 112 determines if the current compressed value is identical to the historical compressed value. If the two values are identical, then the database comparison program 112 determines that there have been no changes to the database schema from when the historical compressed value was created. Referring to step s245, the database comparison program 112 notifies a user that there has been no change to the database 122, using user interface 114 (FIG. 1).

Referring to optional step s250, the database comparison program 112 compares the subsets for the historical compressed values to the subsets for current compressed values. Subsets that contain the identical compressed value would be considered to have no changes that occurred to the database schema from when the subsets for the historical compressed values were created. Subsets with different compressed values will be recorded.

Referring to step s260, the database comparison program 112 notifies a user that there are changes in the database 122. In embodiments where there were subsets for the historical compressed value, the database comparison program 112 notifies the user which subsets have changed since the historical compressed values were created.

Figure 4:
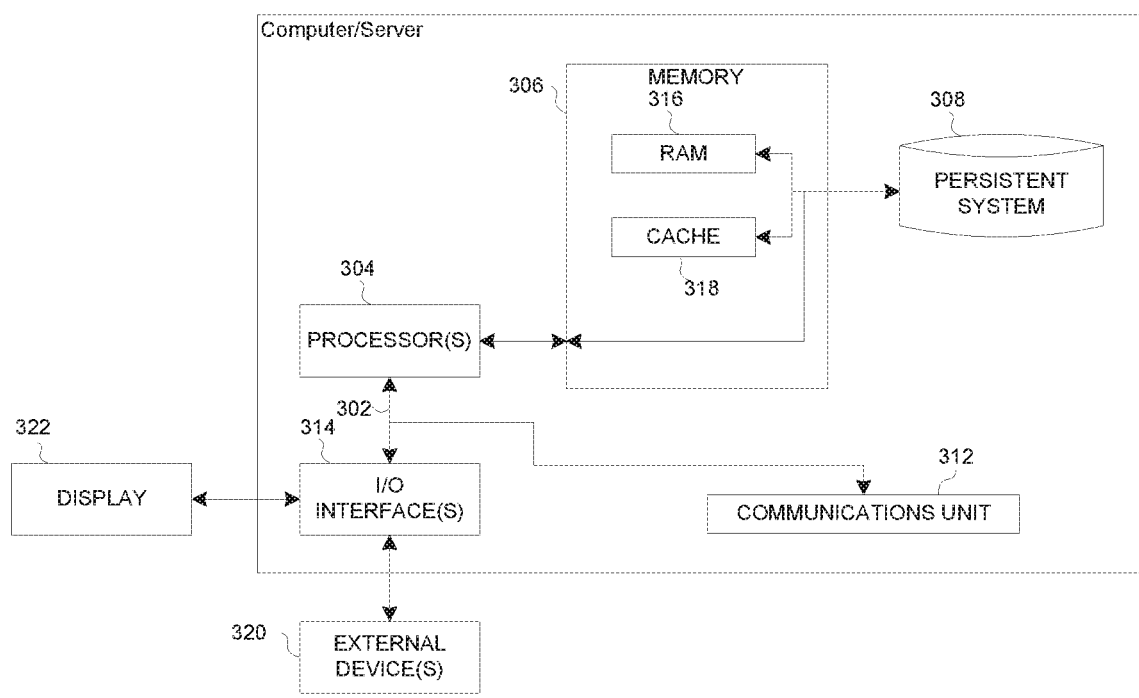
FIG. 4 is a block diagram depicting the hardware components of the computing device and client server of FIG. 1, in accordance with an embodiment of the invention.

FIG. 4 depicts a block diagram of components of either computing device 110 (FIG. 1) or Server 120 (FIG. 1), or both, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and Server 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs database comparison program 112 and compressed value storage in computing device 110; and database 122 in Server 120 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs database comparison program 112 and compressed value storage in computing device 110; and database 122 in Server 120 may be downloaded to persistent storage 308 through communications unit 312.

I/O interface(s) 314 allows for input and output of data with other devices that may be connected to computing device 110 and Server 120. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., The programs database comparison program 112 and compressed value storage in computing device 110; and database 122 in Server 120, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for detecting changes in database schema, the method comprising:
   receiving a first database schema, wherein the first database schema is metadata corresponding to a first database;
   creating a first value corresponding to the first database schema by utilizing a compressed value algorithm, wherein the compressed value algorithm creates a single value corresponding to each database schema;
   receiving a second database schema, wherein the second database schema is metadata corresponding to a second database;
   creating a second value corresponding to the second database schema by utilizing the compressed value algorithm;
   determining whether a difference exists between the first database schema and the second database schema by comparing the first value and the second value.

2. The method of claim 1, wherein the compressed value algorithm is a hash value algorithm.

3. The method of claim 1, further comprising:
   creating a third value corresponding to a portion of the first database schema;
   creating a fourth value corresponding to a portion of the second database schema;
   determining whether a difference exists between the portion of the first database schema and the portion of the second database schema by comparing the third value and the fourth value.

4. The method of claim 1, wherein the second database is a later version of the first database, and wherein the second database schema is received from the first database some period of time after the first database schema is received from the first database.

5. The method of claim 4, wherein the first database schema corresponds to the first database at installation of the first database.

6. The method of claim 1, further comprising indicating to a user whether the difference exists between the first database schema and the second database schema.

7. The method of claim 1, further comprising storing the first value in memory.

* * * * *